United States Patent [19]
Emery

[11] Patent Number: 5,174,098
[45] Date of Patent: Dec. 29, 1992

[54] APPARATUS FOR CUTTING VEGETATION

[75] Inventor: Benjamin H. Emery, Pittsburgh, Pa.

[73] Assignee: Emery Tree Service, Inc., Pittsburgh, Pa.

[21] Appl. No.: 796,114

[22] Filed: Nov. 20, 1991

[51] Int. Cl.⁵ .................. A01D 34/64; A01D 34/86; A01D 34/60; A01G 3/08
[52] U.S. Cl. .................. 56/10.7; 30/379.5; 56/11.9; 56/15.2
[58] Field of Search .............. 56/10.6, 10.7, 11.9, 56/13.5, 14.1, 15.2, 15.9, 255; 30/379.5; 144/343, 335, 338; 83/928

[56] References Cited

U.S. PATENT DOCUMENTS

| | | | |
|---|---|---|---|
| 3,548,951 | 12/1970 | Weasel, Jr. et al. | 56/10.7 X |
| 3,729,910 | 5/1973 | Hardee | 56/11.9 |
| 4,411,070 | 10/1983 | Boyum et al. | 56/11.9 X |
| 4,495,754 | 1/1985 | Cartner | 56/11.9 |
| 4,502,269 | 3/1985 | Cartner | 56/15.2 X |
| 4,506,464 | 3/1985 | Cartner | 56/11.9 X |
| 4,631,907 | 12/1986 | Zirps | 56/11.9 |
| 4,683,924 | 8/1987 | Cornelius | 30/379.5 X |
| 4,996,830 | 3/1991 | Davison | 56/15.2 X |
| 5,086,613 | 2/1992 | Fox et al. | 56/11.9 X |
| 5,123,462 | 6/1992 | Davison | 30/379.5 X |

Primary Examiner—Stephen J. Novosad
Attorney, Agent, or Firm—Kirkpatrick & Lockhart

[57] ABSTRACT

An apparatus for cutting vegetation such as tree branches is disclosed, which includes a vehicle, a first boom attached to the vehicle, a second boom attached to the first boom, and a cutter attached to the second boom. A first piston and cylinder is attached between the vehicle and the first boom, a second piston and cylinder is attached between the first boom and the second boom, and a third piston and cylinder is attached between the second boom and the cutter. A first engine is mounted on the vehicle and operatively connected to the pistons and cylinders, and a second engine is also mounted on the vehicle and is operatively connected to only power the cutter.

19 Claims, 3 Drawing Sheets

APPARATUS FOR CUTTING VEGETATION

BACKGROUND OF THE INVENTION

1. Field of the Invention

The present invention relates to apparatuses for cutting, and more particularly to apparatuses for cutting vegetation such as tree branches, trees, and brush.

2. Description of the Invention Background

Various apparatuses which are useful for cutting vegetation such as brush or tree branches are known in the prior art. For example, U.S. Pat. No. 4,769,977 to Milbourn discloses a brush cutter which includes a backhoe, an articulated boom structure formed by three booms which is carried by the backhoe, a workhead attached to the outer boom, and a rotary cutter carried by the workhead. A hydraulic motor drives the rotary cutter, and the booms are movable through hydraulic pistons and cylinders. The backhoe is commercially available with a single engine providing power to drive the backhoe and the hydraulic system for operating two of the booms. According to that patent, the hydraulic system also operates the third boom and the hydraulic motor.

U.S. Pat. No. 4,509,315 to Giguere discloses a mowing apparatus to cut various kinds of vegetation, which includes a floating work head carried by an articulated hydraulic arm which is attached to a work vehicle. The work head carries a rotating element having a pair of cutting blades thereon, and an undescribed motor which rotates the rotating element. Also, U.S. Pat. No. 4,502,269 to Cartner discloses a boom mower which includes a tractor having an engine, a boom assembly connected at one end to the tractor, and a mowing apparatus connected to the other end of the boom assembly. The mowing apparatus includes a cutter assembly and a hydraulic motor powered by a pump driven by the engine for rotating the cutter assembly, and a boom articulation control means is disclosed which includes hydraulic pistons and cylinders.

Each of the above references has the disadvantage that a separate power supply is not disclosed for supplying power solely to the cutting assembly thereof. For example, in the Milbourn patent, a standard backhoe hydraulic system powered by a single engine which normally powers two booms is modified to supply hydraulic power both to an additional boom and a cutting assembly. Such a modification can place much greater requirements on the backhoe engine, even requirements above the capability of the single engine, which can result in less than a predetermined amount of power being supplied to the cutting assembly.

U.S. Pat. No. 3,061,996 to Ripps discloses a mower which includes a separate engine which provides power to operate a cutter bar. The mower includes a tractor, a boom mounted on the tractor, a platform mounted to the boom to which the engine and the cutter bar are mounted, hydraulic cylinders to move the boom and the platform, and pressure means of the tractor for supplying fluid under pressure to the cylinders. The Ripps patent has the disadvantage, however, that the separate engine is located at the end of the boom away from the tractor so that the engine can be directly mechanically connected to the cutter bar. Such an arrangement can add unnecessary weight to the end of the boom, which can adversely affect the speed at which the boom can be moved and the overall balance of the apparatus, as well as posing a greater danger that the boom or the hydraulic cylinders will break.

OBJECTS AND SUMMARY OF THE INVENTION

In view of the above, it is an object of the present invention to provide an apparatus which is useful for cutting vegetation such as tree branches, trees or shrubbery.

It is another object of the present invention to provide an apparatus for cutting vegetation which is able to deliver a predetermined amount of power to a cutting means thereof while other elements of the apparatus are also operating.

A further object of the present invention is to provide an apparatus for cutting vegetation which includes a boom which is able to move at relatively high speeds.

Yet another object of the present invention is to provide an apparatus for cutting vegetation which is relatively well-balanced.

It is also an object of the present invention to provide an apparatus for cutting vegetation which includes a boom and boom moving means which break down relatively rarely.

The above objects as well as other objects not specifically enumerated are accomplished by an apparatus for cutting vegetation in accordance with the present invention. An apparatus for cutting vegetation in accordance with the present invention includes a vehicle, a first boom attached to the vehicle, a second boom attached to the first boom, and cutting means attached to the second boom for cutting vegetation. Moving means are provided for moving the first and second booms, and first engine means are mounted on the vehicle for powering the moving means. Second engine means are mounted on the vehicle spaced from the first engine means for powering the cutting means.

The objects of the present invention are also accomplished by an apparatus for cutting vegetation which includes a vehicle, a first boom attached to the vehicle, a second boom attached to the first boom, and a cutter attached to the second boom. A first piston and cylinder is attached between the vehicle and the first boom, and a second piston and cylinder is attached between the first boom and the second boom. A first engine is mounted on the vehicle and is operatively connected to the first and second pistons and cylinders, and a second engine is mounted on the vehicle and is operatively connected to the cutter.

These and other objects and advantages of the invention will be better understood as the following descriptions of the preferred embodiment of the invention proceed.

BRIEF DESCRIPTION OF THE DRAWINGS

The preferred embodiments of the present invention will be described in greater detail with reference to the accompanying drawings, wherein like members bear like reference numerals and wherein.

DETAILED DESCRIPTION OF THE PREFERRED EMBODIMENTS

Figure 1:
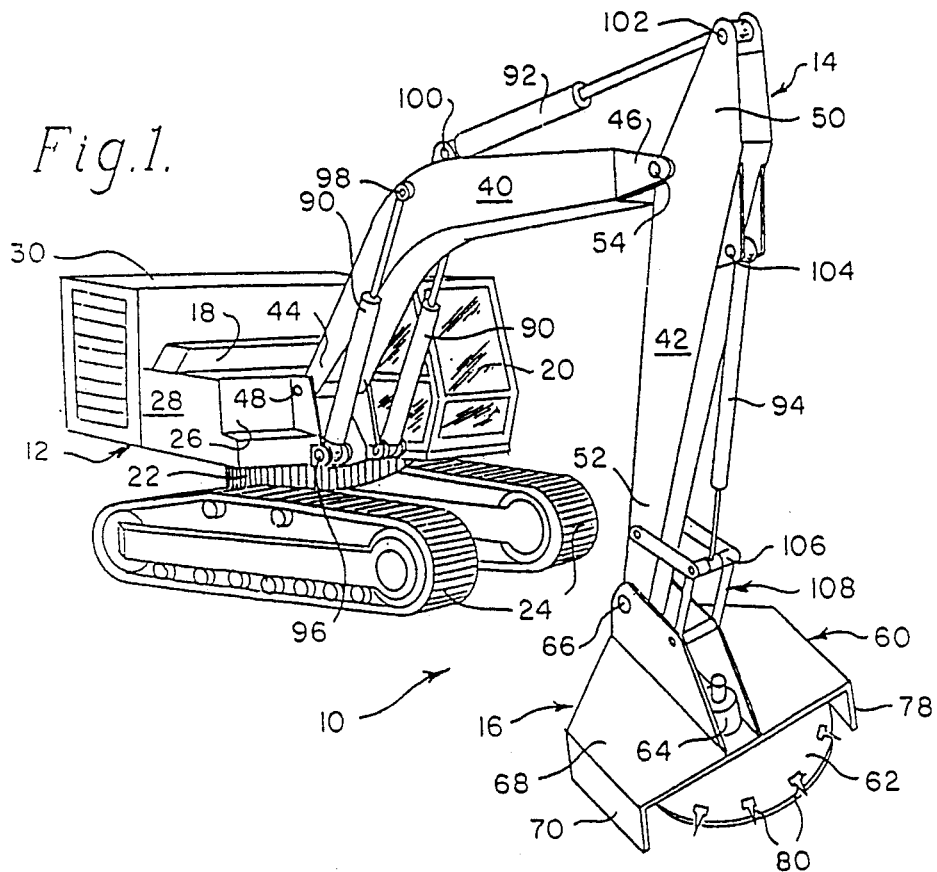
FIG. 1 is a perspective view of an apparatus of the present invention for cutting vegetation.

With reference to FIGS. 1-5, an apparatus 10 for cutting vegetation such as tree branches, trees, and brush includes a vehicle 12 carrying a boom assembly 14 and a cutter 16. The vehicle 12 can be of a standard type having a main body 18, a cab 20 for an operator, a pivotable base 22, and a pair of drivable tracks 24. Depending on the environment in which the vehicle will be used, the vehicle may include wheels instead of tracks.

The vehicle body 18 has a forward end 26 and a rear end 28, and a pair of engines are housed within the body. The first engine (not shown) is the main operating engine of the vehicle 12, and is generally a standard part of the vehicle 12. A second engine 30 is mounted at the rear end 28 of the vehicle body 18 at a location spaced from the first engine, and is added to the vehicle specifically to power the cutter 16 as will be described hereinbelow. Indeed, by placing the second engine 30 at the rearmost portion of the vehicle body, I have learned that the counterweight which is normally required by these vehicles, which may weigh over 10,000 pounds may be deleted thereby lowering initial vehicle cost.

Figure 2:
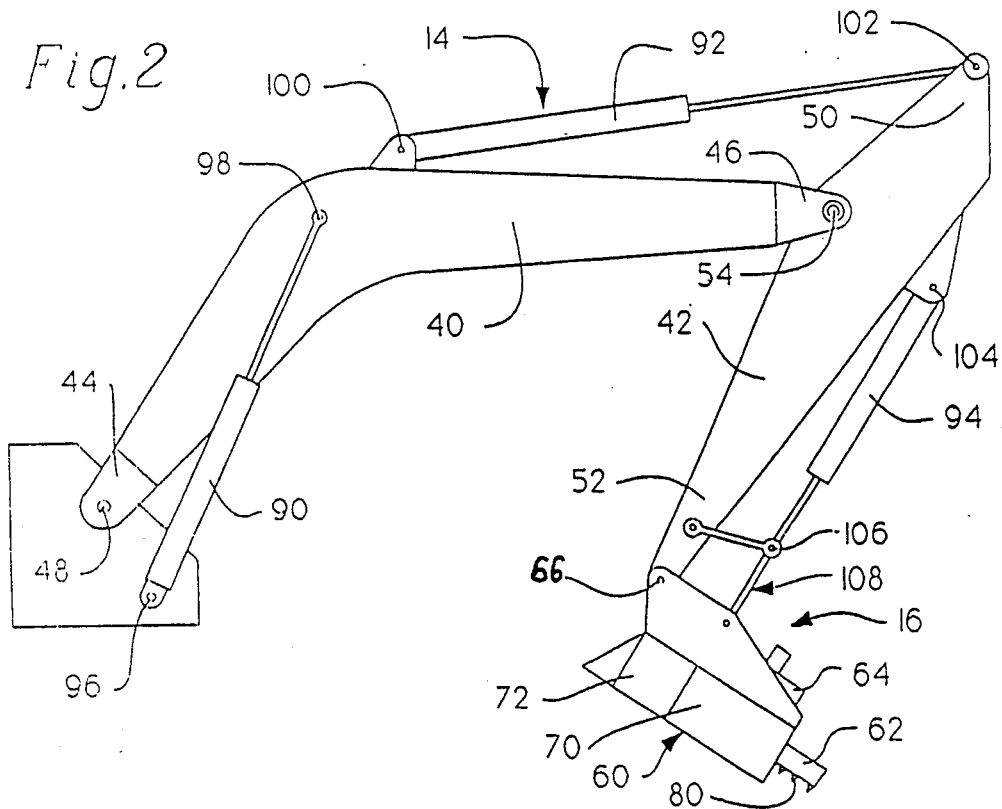
FIG. 2 is a side view of a boom assembly and a cutter of the present invention.

As seen in FIGS. 1 and 2, the boom assembly 14 includes a first boom 40 and a second boom 42. The first boom 40 includes a first end 44 and a second end 46, and the first end 44 is pivotally attached to the forward end 26 of the vehicle body 18 by a pin 48. The second boom 42 also includes a first end 50 and a second end 52, and the second end 46 of the first boom 40 is pivotally attached to the first end 50 of the second boom 42 by a pin 54.

Figure 3:
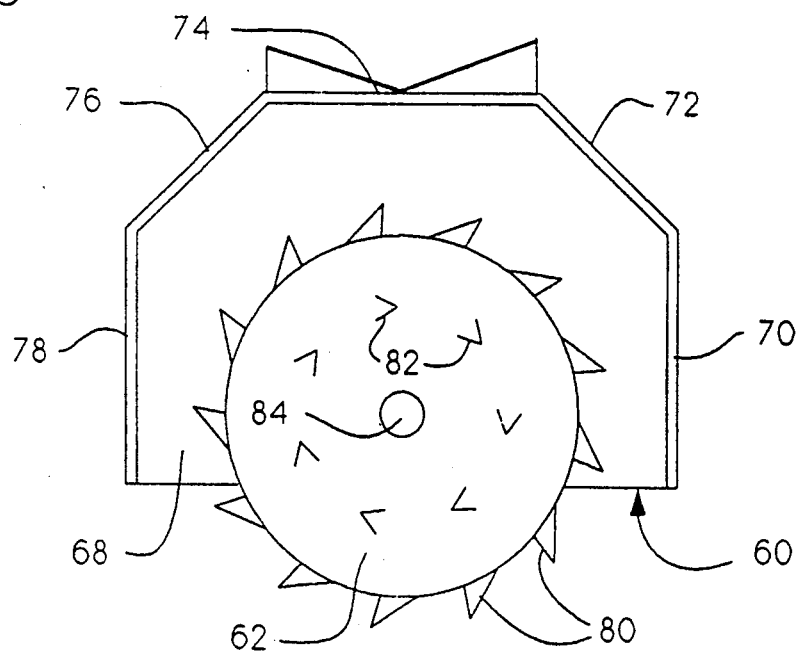
FIG. 3 is a bottom view of the cutter of FIG. 2.

The cutter 16 includes a housing 60, a cutting disk 62, and a hydraulic motor 64. The housing 60 is pivotally attached to the second end 52 of the second boom 42 by a pin 66. As shown in FIG. 3, the housing 60 is roughly hexagonal, and includes a top plate 68 which extends over a large portion of the cutting disk 62 and side plates 70, 72, 74, 76, 78 which extend around the cutting disk 62 such that only a forward portion of the cutting disk 62 extends from the housing 60. The cutting disk 62 includes a plurality of cutting teeth 80 which are spaced around an outer circumference of the disk 62, and it may also include cutting teeth 82 mounted on an underside of the disk 62. The teeth 80, 82 are preferably formed separately from the cutting disk 62 and are mounted on the cutting disk 62 in slots (not shown) in the disk 62 by welding, bolts, or any other standard fastening technique. The cutting disk 62 is mounted on a shaft 84 for rotation with the shaft 84. The shaft 84 extends into the hydraulic motor 64, and the hydraulic motor 64 supplies rotational force to the shaft 84.

With reference again to FIGS. 1 and 2, the boom assembly 14 and the cutter 16 are moved relative to the vehicle 12 by first pistons and cylinders 90, a second piston and cylinder 92, and a third piston and cylinder 94. The first pistons and cylinders 90, which move the first boom 40, are pivotally attached to the vehicle 12 by pins 96 and to the first boom 40 by pins 98. The second piston and cylinder 92 moves the second boom 42 relative to the first boom 40, and is pivotally attached to the first boom 40 by a pin 100 and to the second boom 42 by a pin 102. The third piston and cylinder 94 moves the cutter 16 relative to the second boom 42, and is pivotally attached to the second boom 42 by a pin 104 and to the housing 60 of the cutter 16 by a pin 106 and a link assembly 108. Each of the pistons and cylinders 90, 92, 94 are operated by hydraulic fluid supplied by a pump or pumps (not shown) which are powered by the first engine (not shown).

Figure 4:
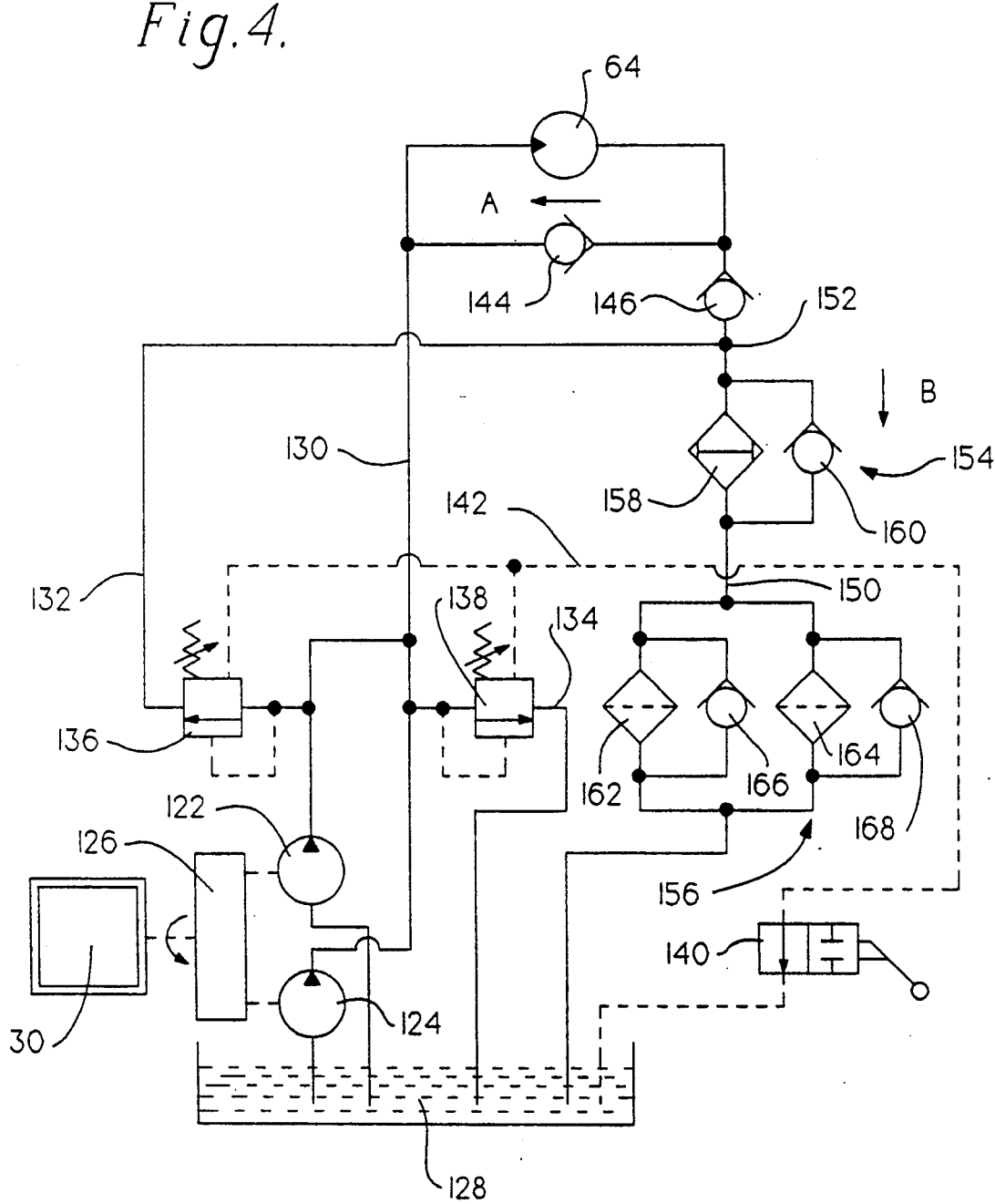
FIG. 4 is a schematic drawing of a hydraulic system for driving the cutter of FIG. 2.

Power to rotate the cutting disk is supplied by the second engine 30, as is shown in more detail in FIG. 4. FIG. 4 is a schematic diagram of a hydraulic system 120 for powering the cutter 16. The second engine 30 is a commercially available engine which operates, i.e., at about 350 horsepower at about 2100 rpm, to drive two pumps 122, 124 in parallel through a one-to-one transmission 126. The pumps 122, 124 draw hydraulic fluid from a basin generally designated as 128. The pump 122 is connected at its exit port to a hydraulic line 130 and a relief line 132 in parallel, and the pump 124 is connected in parallel at its exit port to the hydraulic line 130 and a relief line 134.

Each of the relief lines 130, 132 have a controlled relief valve 136, 138 respectively therein which is controlled by a switch 140 in the vehicle cab 20. The switch 140 is of the type which changes the pressure in a hydraulic switch line 142 which is connected to the relief valves 136, 138 to open and close the relief valves 136, 138. The controlled relief valves 136, 138 are also preferably of the type which Will, unless opened by switch 140, remain closed unless a very high pressure, i.e., approximately 3500 p.s.i., develops upstream of the relief valves 136, 138. The relief line 132 joins with the hydraulic line 130 downstream of the hydraulic motor 64 to form a return line 150, while the relief line 134 returns fluid directly to the basin 128.

Located in the hydraulic line 130, in parallel, are the hydraulic motor 64 and a check valve 144. The check valve 144 allows fluid flow only in the direction shown by the arrow A, and its purpose will be described hereinbelow in more detail. Another check valve 146 is located in the hydraulic line 130 in series with the hydraulic motor 64 and the check valve 146 to prevent backflow in the hydraulic line 130.

The hydraulic line 130 and the relief line 132 join at the point 152 to form the return line 150. The return line 150 returns fluid to the basin 128, and includes, in series, a fluid cooling arrangement 154 and a filter arrangement 156. The fluid cooling arrangement 154 includes an air-to-fluid cooler 158 for decreasing the temperature of hydraulic fluid in the return line 150, and a check valve 160 set in parallel with the cooler 158. The check valve 160 allows fluid flow only in the direction of arrow B and is spring-loaded such that only a fluid pressure higher than, e.g., 65 p.s.i., will open the valve 160. The check valve 160 thus operates as a bypass to the cooler 158 if the cooler becomes clogged. The filter arrangement 156 includes a pair of filters 162, 164 in parallel, and a pair of check valves 166, 168 in parallel with the filters 162, 164. The filters 162, 164 are preferably designed to filter out particles which are larger than about 25 microns in size. Like the check valve 160, the check valves 166, 168 allow fluid flow only in the direction of arrow B and are spring-loaded to open only under a fluid pressure greater than, e.g., 30 p.s.i. The check valves 166, 168 thus operate as bypasses for the filters 162, 164 if the filters 162, 164 become clogged.

Figure 5:
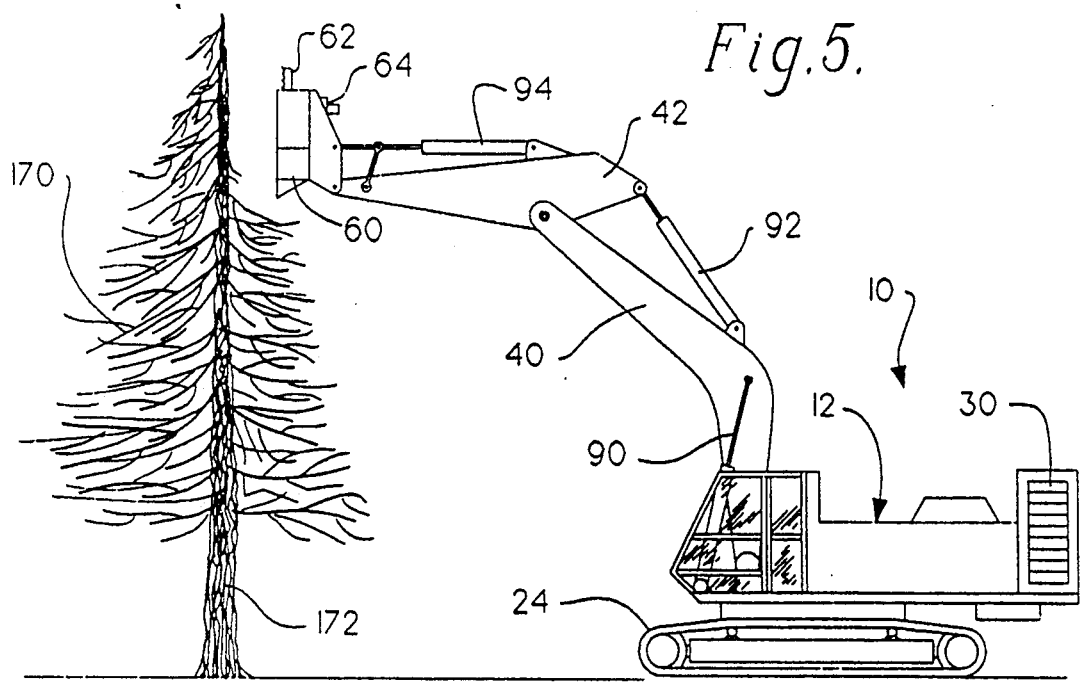
FIG. 5 is a side view of the apparatus of FIG. 1 shown cutting the branches from a tree.

With reference to FIGS. 1-5, the operation of the apparatus 10 for cutting vegetation is as follows: As shown in FIG. 5, one of the main uses for the apparatus 10 is to remove branches and leaves from a tree before the tree is felled so that the tree can be hauled away as soon as it is felled. An operator drives the vehicle to a location near a tree 170, and then operates controls in the cab 20 to move the cutter 16 to a location near the top of the tree 170. This movement is accomplished by movement of the first boom 40, the second boom 42, and/or the cutter 16 through control of one or more of the first, the second, and the third pistons and cylinders 90, 92, 94, and results in the cutting disk 62 being positioned near the top of and generally parallel to the trunk 172 of the tree 170.

The second engine 30 runs the pumps 122, 124 continuously while it operates, so the pumps 122, 124 continuously cycle fluid through the relief lines 132, 134 and the return line 150 when the relief valves 136, 138 are opened by switch 140. Fluid will not appreciably flow through the hydraulic line 130 since the hydraulic line 130 is much longer than the relief lines 132, 134 and the return line 150, and since the hydraulic motor 64 has a great amount of inertia which resists fluid flow in the hydraulic line 130. The power provided to the hydraulic motor 64 may also be varied by adjusting the throttle for the second engine 30.

The operator can close the switch 140 at any time before, during, or after positioning of the cutter 16 near the tree 170, which will cause the relief valves 136, 138 to close and will force hydraulic fluid from the pumps 122, 124 to flow through the hydraulic line 130. As the fluid flows through hydraulic line 130, it will flow through the hydraulic motor 64, which will turn the shaft 84 of the cutting disk 62 so that the cutting disk 62 rotates. Since the fluid pressure upstream of the check valve 144 is much greater than the fluid pressure required to open the check valve 146, the check valve 144 will remain closed, the check valve 146 will open, and fluid from the hydraulic motor 64 will circulate through the return line 150, the cooler 158, the filters 162, 164, and the basin 128.

After the operator has started rotation of the cutting disk 62 and has positioned the cutter 16, the operator then operates the first, second, and third pistons and cylinders 90, 92, 94 to lower the cutter 16 in a path such that the cutting disk 62 moves generally parallel down the length of the trunk 172. As seen in FIG. 5, the downward movement of the rotating cutting disk 62 causes the teeth 80, 82 to come into contact with tree branches and foliage at high speed. The teeth 80, 82 thus rip and cut the branches and foliage from the tree 170 so that one side of the tree trunk 172 is left bare. As the branches and foliage are cut from the tree 170, they tend to fly away from the cutting disk 62 at a very high speed. The housing 60 is thus provided to reduce the possibility that such debris will fly in undesired directions, such as toward the apparatus 10 and persons standing near it. When one side of the tree 170 has been stripped, the operation can be repeated on the other side of the tree, and the bare trunk can then be felled and immediately removed for processing.

Once the cutting disk 62 is finished with its cutting operation, the operator can open the switch 140 to open the relief valves 136, 138. Fluid from the pumps will then start to flow through the shorter relief lines 132, 134 and will continue flow through the much longer hydraulic line 130. The hydraulic motor 64 will, however, continue to rotate for a period of time due to the high inertia which the cutting disk 62 and the hydraulic motor 64 possess. This continued rotation causes fluid to continue to flow toward the check valve 146, but since the pressure upstream of the hydraulic motor 64 is now much lower, the check valve 144 will open and the check valve 146 will close under its own spring force. Fluid will therefore flow for a time in a clockwise loop in FIG. 4 through the hydraulic motor 64 and the check valve 144. This circular flow prevents the rotating hydraulic motor 64 from continuing to place suction on the hydraulic line 130 leading to the pumps 122, 124 and thus reduces the chance that the hydraulic motor 64 will cavitate, which reduces the chances of damage occurring to the motor 64.

The apparatus for cutting vegetation of the present invention enjoys a number of advantages. For example, the provision of a separate engine and hydraulic system solely to power the cutter allows a predetermined amount of power to be supplied to the cutter even when the pistons and cylinders are being actuated to move the booms or the cutter. Movement of the booms and cutter does not automatically entail a reduction in power to the cutter, and the cutting disk can thus be continuously rotated at a desired speed.

Additionally, as noted above, the second engine is placed at a rear end of the vehicle, which allows the second engine to act as a counterweight to the boom assembly and the cutter, since the boom assembly is mounted to a forward end of the vehicle. The additional counterweight of the second engine tends to increase the stability of the apparatus overall, especially when the apparatus is compared with a cutting apparatus which carries an engine at an end of a boom structure. An engine at an end of a boom structure necessarily increases the weight the boom structure must carry and thereby tends to decrease the speed of movement of the boom structure and the resistance of the boom structure to breakdown.

It should be appreciated that even though the apparatus of the present invention is disclosed as being useful for stripping branches and foliage from trees, it can equally advantageously be used for operations such as cutting down small stands of trees or removing brush from an overgrown area. In such cases, an operator could position the cutter 16 such that the cutting disk 62 is generally parallel with the ground, and then move the cutter 16 into the brush or stand of trees.

Also, it should be realized that various changes or modifications may be made to the apparatus 10 and advantageous results still obtained therefrom. For example, although two booms are shown, one boom or three or more booms may be advantageously used. Different arrangements, numbers, or types of cutting teeth may be used on the cutting disk and different cutting disk housing shapes may be used, and advantages may be obtained therefrom. Various modifications may be made to the hydraulic system of the present invention without departing from the scope of the present invention. For example, both relief lines may be advantageously connected to the return line, different numbers of pumps may be advantageously used, and different size filters may be advantageously used. Also, the various check valves may be set to open at different pressures, and advantages still obtained therefrom.

The principles, a preferred embodiment and the mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. An apparatus for cutting an object, comprising:
   a vehicle;
   a first boom attached to said vehicle;
   a second boom attached to said first boom;
   cutting means attached to said second boom for cutting vegetation;
   moving means for moving said first and second booms and said cutting means;
   first engine means mounted on said vehicle for powering said moving means; and
   second engine means mounted on said vehicle spaced from said first engine means for powering said cutting means.

2. An apparatus as claimed in claim 1, wherein said vehicle includes a forward end and a rear end, and wherein said first boom is attached to said forward end of said vehicle and said second engine means is mounted on said rear end of said vehicle.

3. An apparatus as claimed in claim 1, wherein said first and second booms each include a first end and a second end, and wherein said first end of said first boom is attached to a forward end of said vehicle, said second end of said first boom is attached to said first end of said second boom, and said second end of said second boom is attached to a housing of said cutting means.

4. An apparatus as claimed in claim 1, wherein said first boom is pivotally attached to a forward end of said vehicle, said second boom is pivotally attached to said first boom, and a housing of said cutting means is pivotally attached to said second boom.

5. An apparatus as claimed in claim 1, wherein said cutting means includes a housing, a rotatable cutting disk, and a hydraulic motor rotatably drivingly connected to said cutting disk.

6. An apparatus as claimed in claim 1, further including a hydraulic system connected between said second engine means and said cutting means to transmit power from said second engine means to said cutting means, said hydraulic system including a hydraulic pump powered by said second engine means, and hydraulic line means for carrying hydraulic fluid from said hydraulic pump to a hydraulic motor of said cutting means.

7. An apparatus as claimed in claim 6, wherein said hydraulic system further includes relief line means connected to said hydraulic pump in parallel with said hydraulic line means for allowing hydraulic fluid flow from said hydraulic pump to bypass said hydraulic motor, relief valve means for controlling flow through said relief line means, and switch means for opening and closing said relief valve means.

8. An apparatus as claimed in claim 1, wherein said moving means includes a first piston and cylinder connected between said vehicle and said first boom, a second piston and cylinder connected between said first boom and said second boom, and a third piston and cylinder connected between said second boom and a housing of said cutting means.

9. An apparatus as claimed in claim 1, wherein said second engine means generates over 300 horsepower.

10. An apparatus for cutting an object, comprising:
    a vehicle;
    a first boom pivotally attached to said vehicle;
    a second boom pivotally attached to said first boom;
    a cutter attached to said second boom;
    a first piston and cylinder attached between said vehicle and said first boom;
    a second piston and cylinder attached between said first boom and said second boom;
    a third piston and cylinder attached between said second boom and a housing of said cutter;
    a first engine mounted on said vehicle and operatively connected to said piston and cylinders; and
    a second engine mounted on said vehicle and operatively connected to said cutter.

11. An apparatus as claimed in claim 10, wherein said vehicle includes a forward end and a rear end, and wherein said first boom is attached to said forward end of said vehicle and said second engine is mounted on said rear end of said vehicle.

12. An apparatus as claimed in claim 11, wherein said second engine is mounted on said vehicle at a location spaced from said first engine.

13. An apparatus as claimed in claim 10, wherein said first and second booms each include a first end and a second end, and wherein said first end of said first boom is attached to a forward end of said vehicle, said second end of said first boom is attached to said first end of said second boom, and said second end of said second boom is attached to a housing of said cutter.

14. An apparatus as claimed in claim 10, wherein said first boom is pivotally attached to a forward end of said vehicle, said second boom is pivotally attached to said first boom, and said cutter is pivotally attached to said second boom.

15. An apparatus as claimed in claim 10, wherein said cutter includes a housing, a rotatable cutting disk, and a hydraulic motor rotatably drivingly connected to said cutting disk.

16. An apparatus as claimed in claim 10, further including a hydraulic system connected between said second engine and said cutter, said hydraulic system including a hydraulic pump operatively connected to said second engine, and a hydraulic line extending between said hydraulic pump and a hydraulic motor of said cutter.

17. An apparatus as claimed in claim 16, wherein said hydraulic system further includes a relief line connected to said hydraulic pump in parallel with said hydraulic line, a relief valve in said relief line, and a switch connected to said relief valve to open and close said relief valve.

18. An apparatus as claimed in claim 10, wherein said second engine is of sufficient size to generate about 350 horsepower.

19. An apparatus for cutting tree branches, comprising:
    a vehicle having a forward end and a rear end;
    a first boom having a first end and a second end, said first end being pivotally attached to said forward end of said vehicle;
    a second boom having a first end and a second end, said first end of said second boom being pivotally attached to said second end of said first boom;
    a cutter including a housing, a rotatable cutting disk, and a hydraulic motor rotatably drivingly connected to said cutting disk, said housing being pivotally attached to said second end of said second boom;
    a first piston and cylinder attached between said vehicle and said first boom;

a second piston and cylinder attached between said first boom and said second boom;

a third piston and cylinder attached between said second boom and said housing;

a first engine mounted on said vehicle and operatively connected to said pistons and cylinders to pivot said cutter and said first and second booms;

a second engine mounted on said rear end of said vehicle at a location spaced from said first engine; and a hydraulic system connected between said second engine and said hydraulic motor, said hydraulic system including a hydraulic pump operatively connected to said second engine, a hydraulic line extending between said hydraulic pump and said hydraulic motor, a return line extending between said hydraulic motor and said hydraulic pump, an air-to-fluid cooler in said return line, a filter in said return line, a relief line extending between said hydraulic pump and said return line in parallel with said hydraulic line, a relief valve in said relief line, and a switch connected to said relief valve to open and close said relief valve.

* * * * *